(12) United States Patent
Nakamura et al.

(10) Patent No.: US 10,859,839 B2
(45) Date of Patent: Dec. 8, 2020

(54) HEAD MOUNTED DISPLAY

(71) Applicant: Hitachi-LG Data Storage, Inc., Tokyo (JP)

(72) Inventors: Toshiteru Nakamura, Tokyo (JP); Ryuji Ukai, Tokyo (JP); Takuma Kuno, Tokyo (JP); Takahiro Mouri, Tokyo (JP); Masataka Sugita, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 16/596,812

(22) Filed: Oct. 9, 2019

(65) Prior Publication Data

US 2020/0201047 A1    Jun. 25, 2020

(30) Foreign Application Priority Data

Dec. 21, 2018  (JP) ................. 2018-239754

(51) Int. Cl.
*G02F 1/1335* (2006.01)
*G02B 27/01* (2006.01)
(Continued)

(52) U.S. Cl.
CPC ......... *G02B 27/0172* (2013.01); *G02B 6/003* (2013.01); *G02B 6/0018* (2013.01);
(Continued)

(58) Field of Classification Search
CPC ............ G02B 27/0101; G02B 27/0172; G02B 27/01; G02B 27/017; G02B 27/0961; G02B 2027/0178; G02B 2027/015; G02B 2027/0125; G02B 5/02; G02B 5/04; G02B 5/045; G02B 6/0018; G02B 6/003; G02B 6/0051; G02B 6/0055; H04N 13/344; B60K 2370/334; B60K 2370/1529;
(Continued)

(56) References Cited

U.S. PATENT DOCUMENTS

| | | |
|---|---|---|
| 2003/0165017 A1 | 9/2003 | Amitai |
| 2014/0267636 A1 | 9/2014 | Takagi et al. |
| 2019/0049731 A1* | 2/2019 | Knuettel ................ G02B 30/50 |

FOREIGN PATENT DOCUMENTS

| | | | |
|---|---|---|---|
| JP | 2003-536102 A | 12/2003 | |
| JP | 2014-174429 A | 9/2014 | |
| KR | 10-0644586 | * 11/2006 | ............... H04N 5/74 |

* cited by examiner

*Primary Examiner* — Thoi V Duong
(74) *Attorney, Agent, or Firm* — Mattingly & Malur, PC

(57) ABSTRACT

A head mounted display has a display unit to generate a displayed image, an illumination unit to emit illumination light to the display unit, a projection unit to project image light from the display unit, and a light guide unit to transmit image light from the projection unit to pupils of a user. Here, the illumination unit has light source units, a microlens array that is illuminated by light emitted from the light source units and becomes a virtual secondary light source, a condensing optical member to focus light from the microlens array on the display unit, and a diffusion plate to diffuse light from the microlens array, and the diffusion plate is arranged closer to the condensing optical member than to the microlens array. As a result, a conjugate image is inhibited from being generated with the adoption of a microlens array.

14 Claims, 10 Drawing Sheets

(51) Int. Cl.
  *F21V 8/00* (2006.01)
  *H04N 13/344* (2018.01)
  *G02F 1/13357* (2006.01)
(52) U.S. Cl.
  CPC ..... *G02B 6/0055* (2013.01); *G02F 1/133504* (2013.01); *H04N 13/344* (2018.05); *G02B 2027/0125* (2013.01); *G02B 2027/0178* (2013.01); *G02F 1/133524* (2013.01); *G02F 1/133526* (2013.01); *G02F 1/133602* (2013.01)
(58) Field of Classification Search
  CPC .......... B60K 2370/152; B60K 2370/66; G03H 2223/19; G02F 1/1335; G02F 1/133504; G02F 1/133524; G02F 1/133526; G02F 1/1336; G02F 1/133602; G02F 1/133603; G02F 2001/133507; G02F 2001/133607
  See application file for complete search history.

F I G. 3
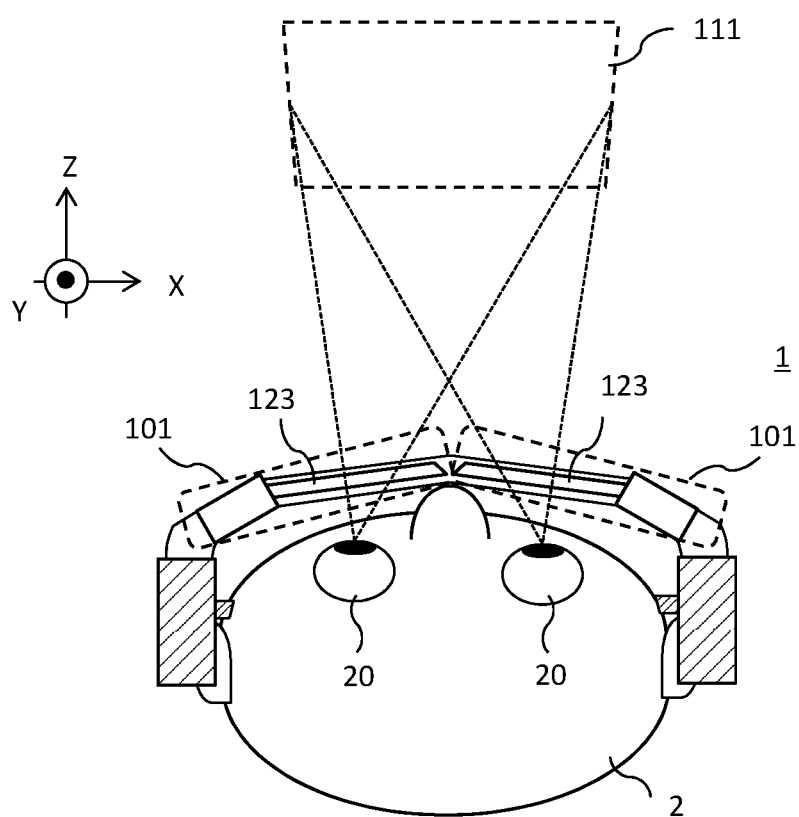

FIG. 4A
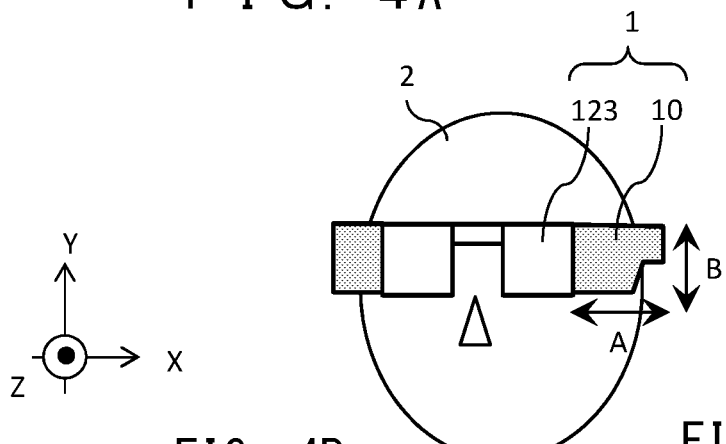
FIG. 4B
FIG. 4C
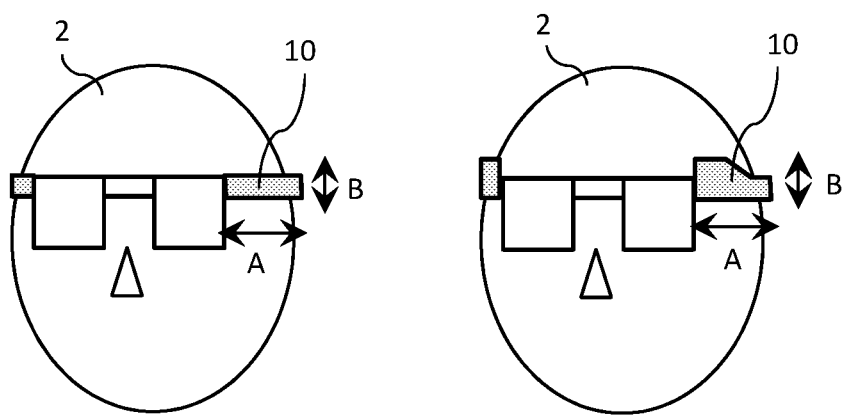
FIG. 5
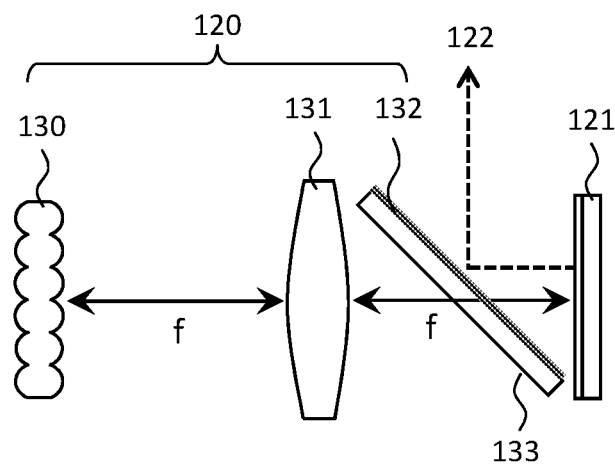

HEAD MOUNTED DISPLAY

CLAIM OF PRIORITY

The present application claims priority from Japanese patent application serial No. JP 2018-239754, filed on Dec. 21, 2018, the content of which is hereby incorporated by reference into this application.

BACKGROUND OF THE INVENTION

(1) Field of the Invention

The present invention relates to a head mounted display being mounted on a user's head and displaying an image within a visual field.

(2) Description of the Related Art

A wearable device such as a head mounted display (hereunder abbreviated also as HMD) is required to have not only display performance such as securement of a good view and visibility of an image but also a structure that is compact and easy to wear. In this regard, a virtual image display device configured so as to guide image light with a prism-shaped member and generate an intermediate image in order to downsize the entire optical system is disclosed in Japanese Unexamined Patent Application Publication No. 2014-174429. Further, an optical device configured so that the optical device includes a light-transmitting substrate, optical means for coupling light into the substrate by total internal reflection, and a plurality of partially reflecting surfaces carried by the substrate, characterized in that the partially reflecting surfaces are parallel to each other and are not parallel to any of the edges of the substrate is disclosed in Japanese Unexamined Application Publication (Translation of PCT Application) No. 2003-536102.

SUMMARY OF THE INVENTION

An optical system of an HMD has an illumination unit that transmits light emitted by a light source unit to a display unit and a projection unit that projects image light (virtual image) generated by the display unit. A high brightness optical system is required in order to use an HMD in a bright outdoor environment. Meanwhile, when a light guide plate is used with emphasis on the see-through nature of an HMD, optical efficiency is deteriorated by the light guide plate and hence a highly bright or highly efficient optical system is required. A problem arising as a result is that the optical system increases in size undesirably.

Further, it is effective to use a microlens array in an illumination unit in order to increase the efficiency and brightness of an optical system. In this regard, the present inventors have found through studies the phenomenon in which, when a microlens array is adopted in an illumination unit, a conjugate image of the microlens array is formed also on an exit pupil of a projection lens. In other words, a user also views the conjugate image together when the user views a projected image, and an arising problem is that a displayed image is disturbed and becomes hardly visible.

In Japanese Unexamined Patent Application Publication No. 2014-174429, Japanese Unexamined Application Publication (Translation of PCT Application) No. 2003-536102, and other prior arts, the problem of generating a conjugate image with the adoption of a microlens array in simultaneously achieving high efficiency, high brightness, and downsizing of an optical system has not been taken into consideration at all.

An object of the present invention is to provide a head mounted display that simultaneously achieves high efficiency, high brightness, and downsizing of an optical system and inhibits a conjugate image from being generated with the adoption of a microlens array.

The present invention is a head mounted display that is mounted on the head of the user and displays an image in a visual field, the head mounted display including a display unit to generate a displayed image, an illumination unit to emit illumination light to the display unit, a projection unit to project image light from the display unit, and a light guide unit to transmit image light from the projection unit to the pupils of the user. Here, the present invention is characterized in that: the illumination unit has a light source unit to emit light; a microlens array that is illuminated by light emitted from the light source unit and becomes a virtual secondary light source; a condensing optical member to focus light from the microlens array on the display unit; and a diffusion plate to diffuse light from the microlens array, and the diffusion plate is arranged closer to the condensing optical member than to the microlens array.

The present invention makes it possible to achieve a head mounted display of a small size and a high brightness screen and provide a virtual image of a good visibility by inhibiting a conjugate image from being generated with the adoption of a microlens array.

BRIEF DESCRIPTION OF THE DRAWINGS

These and other features, objects and advantages of the present invention will become more apparent from the following description when taken in conjunction with the accompanying drawings wherein:

FIG. 3 is a view showing an application of an HMD 1;

FIGS. 4A to 4C are views showing wearability of the HMD 1;

FIG. 5 is a view showing an outline of a telecentric optical system;

DETAILED DESCRIPTION OF THE EMBODIMENT

Embodiments according to the present invention are explained hereunder in reference to the drawings.

Figure 1:
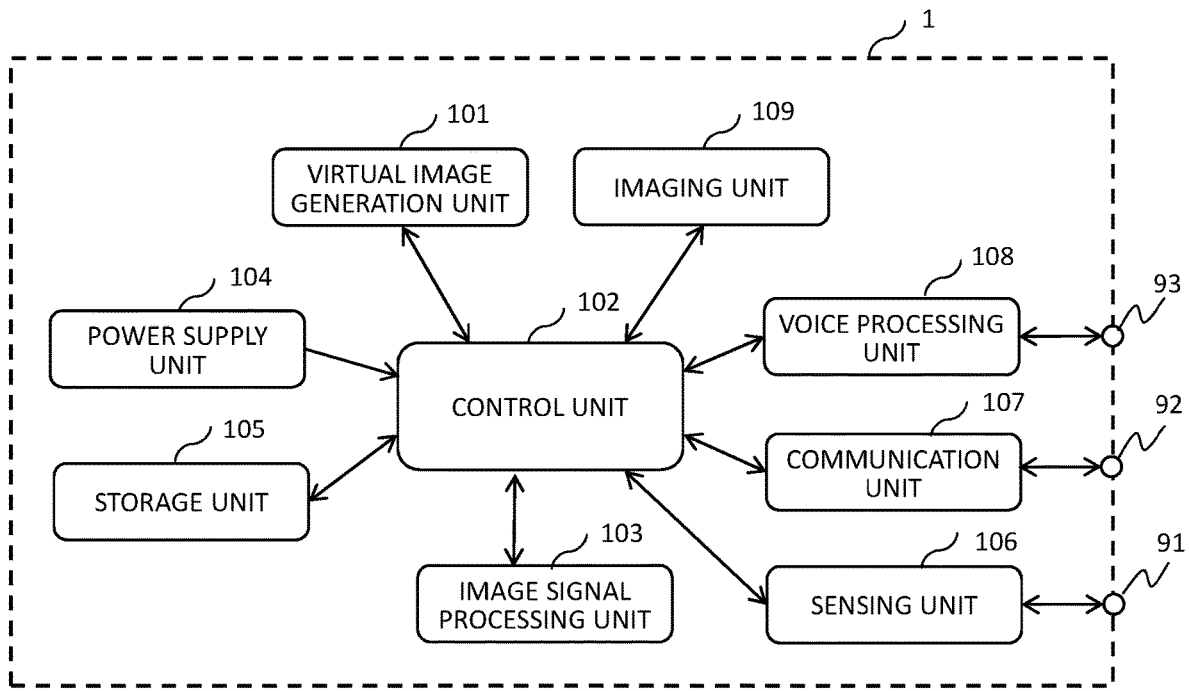
FIG. 1 is a view showing a block configuration example of a head mounted display (HMD) 1.

FIG. 1 is a view showing a block configuration example of a head mounted display (HMD) 1. An HMD 1 has a virtual image generation unit 101, a control unit 102, an image signal processing unit 103, a power supply unit 104, a storage unit 105, a sensing unit 106, a communication unit 107, a voice processing unit 108, an imaging unit 109, and input/output units 91 to 93.

The virtual image generation unit 101 enlarges and projects an image displayed on a display unit (microdisplay) as a virtual image and displays an image of an augmented reality (AR) or a mixed reality (MR) in a visual field of a wearer (user).

The control unit 102 controls the entire HMD 1 integrally. The control unit 102 is functionalized by an arithmetic unit such as a CPU (Central Processing Unit). The image signal processing unit 103 supplies an image signal for display to the display unit in the virtual image generation unit 101. The power supply unit 104 supplies electric power to each unit in the HMD 1.

The storage unit 105 stores information necessary for the processing of each unit in the HMD 1 and information generated at each unit in the HMD 1. Further, when the control unit 102 is functionalized by the CPU, the storage unit 105 stores programs and data processed by the CPU. The storage unit 105 includes storage devices including a RAM (Random Access Memory), a flash memory, an HDD (Hard Disk Drive), and an SSD (Solid State Drive), for example.

The sensing unit 106 is connected to various sensors through the input/output unit 91 that is a connector and detects a posture (namely posture of the user), a movement, an ambient temperature, etc. of the HMD 1 on the basis of signals detected by the various sensors. As the various sensors, for example, an inclination sensor, an accelerometer, a temperature sensor, a sensor of a GPS (Global Positioning System) to detect location information of the user, etc. are connected.

The communication unit 107 communicates with an external information processing device by near field communication, long distance wireless communication, or wired communication through the input/output unit 92 that is a connector. Specifically, the communication unit 107 communicates by Bluetooth (registered trademark), Wi-Fi (registered trademark), a mobile communication network, a universal serial bus (USB, registered trademark), a high-definition multimedia interface (HDMI, registered trademark), etc.

The voice processing unit 108 is connected to a voice input/output device such as a microphone, an earphone, a speaker, or the like through the input/output unit 93 that is a connector and inputs or outputs a voice signal. The imaging unit 109 is a small camera or a small TOF sensor for example and shoots an image in a direction of a visual field of the user of the HMD 1.

Figure 2:
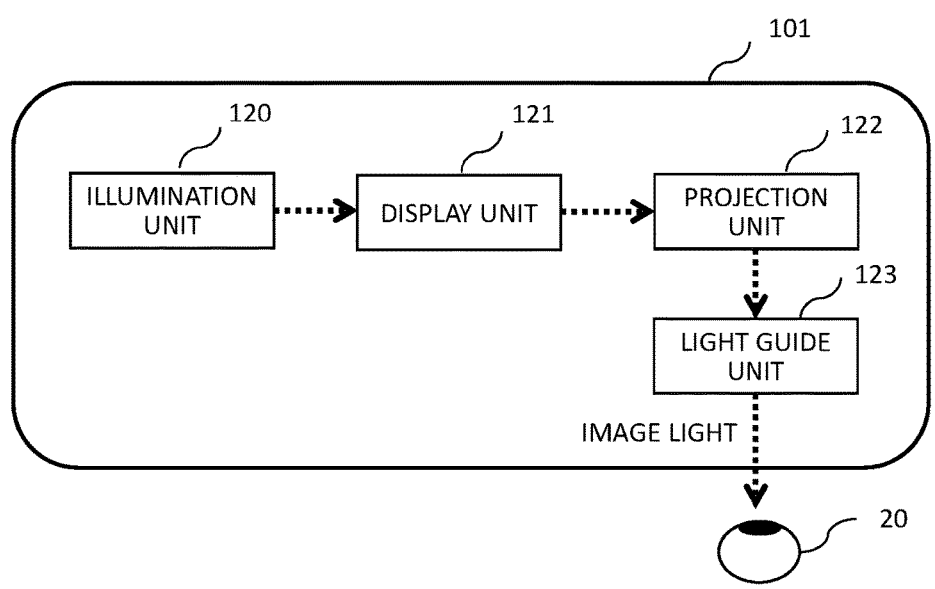
FIG. 2 is a view showing a configuration example of a virtual image generation unit 101.

FIG. 2 is a view showing a configuration example of the virtual image generation unit 101. The virtual image generation unit 101 includes an illumination unit 120, a display unit 121, a projection unit 122, and a light guide unit 123. The illumination unit 120 emits light from a light source such as an LED or a laser to the display unit 121. The display unit 121 is a microdisplay to display an image, and a liquid crystal display, a digital micromirror device, an organic EL display, etc. are used. The projection unit 122 enlarges image light of the display unit 121 and projects the enlarged image light as a virtual image. The light guide unit 123 transmits image light from the projection unit 122 to pupils 20 of the user. The user can visualize an image by focusing the image light on the pupils 20.

FIG. 3 is a view showing an application of the HMD 1. Here, a state of looking down from above the head of a user 2 is shown, the X axis indicates a horizontal direction, the Y axis indicates a vertical direction, and the Z axis indicates a visual axis direction. The directions of the X, Y, and Z axes are defined similarly also in the following drawings.

The HMD 1 is mounted on the head of the user 2 and transmits an image generated in the virtual image generation unit 101 to the pupils 20 of the user through the light guide unit 123. On this occasion, the user 2 can visualize an image (virtual image) in a partial region (image display region) 111 in a visual field in the state of being able to visualize the external world (see-through type). Although a configuration of displaying an image on both eyes is shown here, a configuration of one eye is also acceptable. Further, the HMD 1 can also shoot a visual field range of the user 2 by the imaging unit 109 in FIG. 1.

FIGS. 4A to 4C are views showing wearability of the HMD 1 and shows a state viewed from the front direction (Z direction) of the user 2. The HMD 1 has a glass-type shape, the light guide unit 123 is stored at the positions of the user's eyes, and the illumination unit 120, the display unit 121, and the projection unit 122 are stored in a frame unit 10. Here, a dimension A in a horizontal direction (X direction) and a dimension B in a vertical direction (Y direction) of the frame unit 10 are examined. Further, FIGS. 4A to 4C show three shapes of the frame unit 10 having different dimensions B.

From the viewpoint of wearability of the HMD 1, if the dimension A in the horizontal direction is too large, extrusion of the HMD 1 toward the outside of the head of the user 2 increases and the wearability deteriorates. The dimension A in the horizontal direction therefore is required to be reduced.

Further, with regard to the dimension B in the vertical direction, if the dimension B is large like FIG. 4A, a range where a visual field of the user 2 in the front direction (Z direction) and the lateral direction (X direction) is intercepted increases, and convenience and operability in wearing an HMD deteriorate. In particular, when the user 2 wears the HMD 1 and is engaged in on-site work or the like, the user 2 does the work by using the frontward to front-downward visual field in many cases and the lateral and lateral obliquely-downward visual field is hardly secured.

The lateral and lateral obliquely-downward visual field therefore can be secured desirably by either reducing the dimension B as shown in FIG. 4B or shifting upward and arranging the part of the symbol 10 as shown in FIG. 4C. Specific contents of these are explained in an embodiment described later.

A configuration of the virtual image generation unit 101, in particular focusing on configurations of the illumination unit 120, the display unit 121, and the projection unit 122, is explained hereunder. When a non-emitting type microdisplay is used in the display unit 121 of the virtual image generation unit 101, an illumination optical system having telecentricity is required of the illumination unit 120 from the viewpoint of high brightness and brightness uniformity. Here, conditions of the dimension A for satisfying telecentricity are explained.

FIG. 5 is a view showing an outline of a telecentric optical system. Here, a microlens array 130 that is illuminated by light from a light source unit and becomes a virtual secondary light source unit is adopted as a configuration of the illumination unit 120. Then a condensing optical member 131 is arranged between the microlens array 130 and the display unit 121. Here, a single condensing lens is used as the condensing optical member 131.

In order to form a telecentric optical system, a distance between the microlens array 130 and the condensing lens 131 and a distance between the condensing lens 131 and the display unit 121 are required to be equal to the focal length f of the lens, respectively. In addition, when a reflective liquid crystal display is used for the display unit 121, a polarization splitter 132 such as a polarization beam splitter or a wire grid film has to be arranged between the condensing lens 131 and the display unit 121. Here, a configuration of sticking a wire grid film to an optically transparent substrate 133 is shown as the polarization splitter 132.

The focal length f of the condensing lens 131 therefore has to be a length capable of arranging the polarization splitter 132. An optical effective diameter of the polarization splitter 132 is geometrically determined mainly by a size of the display unit 121 (microdisplay) and an F value of a projection lens.

A size of an ordinary small microdisplay is 0.2 to 0.3 inches in terms of the diagonal of a display area. Further, an F value of a projection lens is desirably F=about 1.7 to 3 from the comprehensive viewpoints of an MTF (Modulation Transfer Function), a size of the lens, a difficulty level in manufacturing, etc. Since necessary effective diameters on both the illumination side and the projection side on this occasion are geometrically determined, a necessary focal length f of the condensing lens 131 can also be determined. A focal length f of the condensing lens 131 is desirably in the range of 8 to 14 mm if mounting distances of a display panel, a polarization splitter, and a condensing lens, a thickness of a condensing lens, etc. are taken into consideration.

A distance from the microlens array 130 to the display unit 121 therefore requires a dimension not less than twice the focal length f. In addition to this, an optical system of the light source unit is required, hence the dimension A increases, and that is a factor of deteriorating the wearability of the HMD 1.

Although the optical system size of the virtual image generation unit 101 has heretofore been explained, a problem here is that a conjugate image of a microlens array (lens cell) and a light source in the illumination unit 120 is generated when an image (virtual image) is visualized by using the light guide unit 123. Problems and inhibiting methods of a conjugate image are explained hereunder.

Figure 6A:
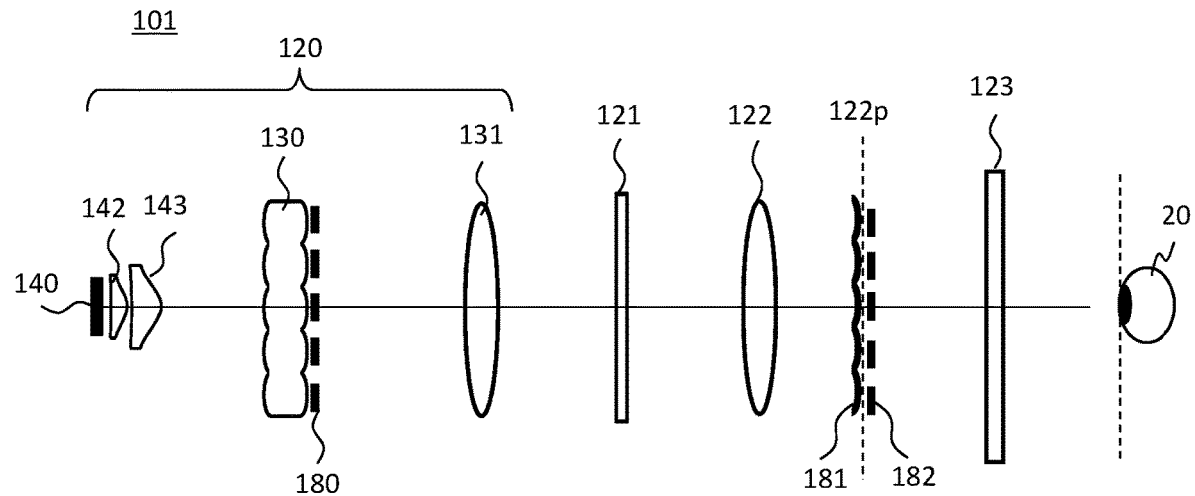
FIG. 6A is a schematic diagram explaining conjugate image generation.

FIG. 6A is a schematic diagram explaining conjugate image generation in the virtual image generation unit 101. Firstly, a configuration of an optical system is explained. In the illumination unit 120, light emitted from a light source 140 enters condenser lenses 142 and 143. Since the light source 140 is generally arranged in the vicinity of a composite focus position of the condenser lenses 142 and 143, a luminous flux emitted from the light source 140 forms substantially collimated light by the condenser lenses. The light from the condenser lenses 142 and 143 illuminates the microlens array 130 that becomes a virtual secondary light source unit. The light passed through the microlens array 130 illuminates the display unit 121 via a condensing lens 131. The light to which information of an image signal is given by the display unit 121 passes through the projection unit 122 and the light guide unit 123 and forms an image on the user's pupils 20 and the user visualizes an image in an HMD.

When an image is visualized in the optical system, a conjugate image 180 of the light source 140 replicated by the microlens array 130 is formed on an exit surface of the microlens array 130. Further, the exit surface of the microlens array 130 and an exit pupil of the projection unit 122 are in a substantially conjugate positional relationship. A conjugate image 181 of the lens cell exit surface of the microlens array 130 and further a conjugate image 182 of the conjugate image 180 of the light source 140 formed on the exit surface of the microlens array 130 therefore are formed at an exit pupil position 122p of the projection unit 122. When the user sees an image through a light guide plate 123 therefore, the conjugate image 181 of the microlens cell and the conjugate image 182 of the light source are seen undesirably in front of the image in a superimposed manner, and visibility of an image deteriorates.

Meanwhile, since the light guide plate 123 has the function of replicating the exit pupil of the projection unit 122 in order to expand an eye box, it sometimes happens that, if the frequency of the replication is high, the conjugate images 181 and 182 overlap with each other repeatedly and become inconspicuous. On the other hand, in the case of using the light guide plate 123 of a beam splitter mirror array type, the frequency of replication is theoretically low in comparison with other methods, and the visibility of an image deteriorates considerably by the conjugate images 181 and 182.

Figure 6B:
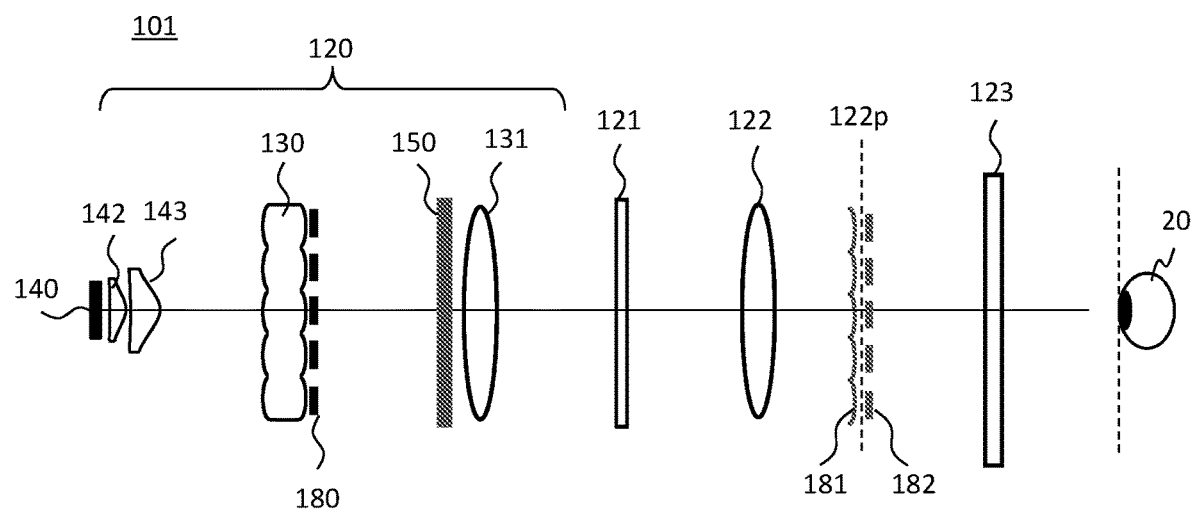
FIG. 6B is a schematic diagram explaining a method of inhibiting conjugate image generation.

FIG. 6B is a schematic diagram explaining a method of inhibiting conjugate image generation. In an optical system in FIG. 6A, a configuration of inhibiting visibility by the conjugate image 181 of the microlens cell and the conjugate image 182 of the light source is shown. In the present configuration, a diffusion plate 150 to diffuse light coming from the microlens array 130 is installed in the vicinity of the condensing lens 131 of the illumination unit 120. By installing the diffusion plate 150, it is possible to blur the conjugate image 181 of a microlens cell and the conjugate image 182 of a light source so as to be inconspicuous. On this occasion, by installing the diffusion plate 150 in front of the display unit 121, it is possible not to affect the resolution of a magnified image (virtual image) of the display unit 121 by the projection unit 122.

In this way, the HMD 1 has the problems of downsizing a frame unit and generating a conjugate image, and methods of solving the problems are explained in the following embodiments.

First Embodiment

In a first embodiment, reduction of a dimension A of the frame unit 10 and inhibition of a conjugate image are explained.

Figure 7A:
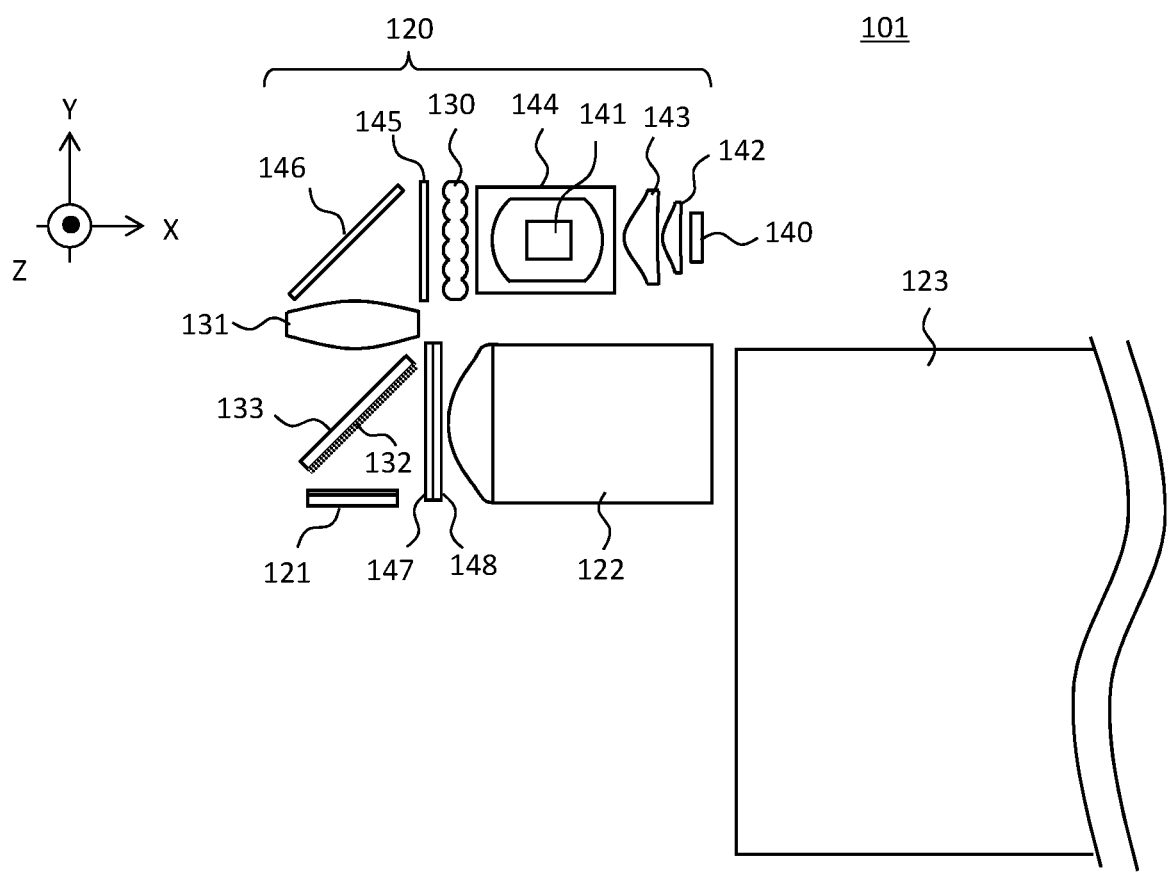
FIGS. 7A and 7B are views showing an example of a configuration of the virtual image generation unit 101 (a first embodiment)
Figure 7B:
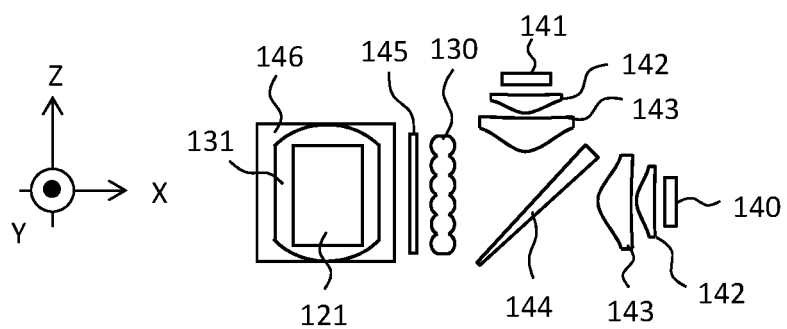

FIGS. 7A and 7B are views showing an example of a configuration of the virtual image generation unit 101 and is a configuration of reducing a dimension A. FIG. 7A is a view viewed from a visual axis (Z axis) direction and FIG. 7B is a view viewed from a vertical (Y axis) direction. In the illumination unit 120, the light source 140 of green (G) and a light source 141 of red (R) and blue (B) are installed as a light source unit. Light from the light sources is substantially collimated by the condenser lenses 142 and 143. The substantially collimated light from the color light sources is composited by a color composition unit 144.

An example of using a wedge-shaped dichroic mirror in the color composition unit 144 as shown in FIG. 7B is shown here. The dichroic mirror composites and emits the substantially collimated light of the R light, the B light, and the G light. On this occasion, the optical axes of the colors do not necessarily coincide with each other and the light axes may be slightly shifted intentionally so that intensity distributions on a predetermined plane may substantially coincide with each other.

The color composited light enters the microlens array 130 that becomes a virtual secondary light source. The microlens array 130 is illuminated by the substantially collimated luminous flux emitted from the color composition unit 144. By using the microlens array 130, it is possible to collect light only in a predetermined range of a microdisplay in the display unit 121. Further, it is possible to equalize the brightness distribution of illumination light on the display unit 121.

When LCOS (Liquid Crystal On Silicon, registered trademark) or the like is used in the display unit 121, only a necessary polarized light component is taken out beforehand by arranging a polarization filter 145 in order to be illuminated by predetermined polarized light. The polarization filter 145 acts advantageously also on the points of a countermeasure against stray light and a contrast.

A bending mirror 146 has the function of bending a light path from the microlens array 130 to the display unit 121 (X direction to Y direction). That is, the length of the optical system in the X axis direction (dimension A in FIGS. 4A to 4C) can be reduced by inserting the bending mirror 146. A condensing lens as the condensing optical member 131 focuses a cell image of the microlens array 130 on the display unit 121.

The polarization splitter 132 divides the light path into two paths to the illumination unit 120 and the projection unit 122. The projection unit 122 projects an image on the display unit 121 as infinity or a virtual image. Image light from the projection unit 122 is emitted to the light guide unit 123, and the user can visualize an image in the state of securing see-through nature. A polarization filter 147 and a quarter wave plate 148 inhibit stray light caused by return light from the projection unit 122 and the light guide unit 123.

A configuration of each unit is explained hereunder in detail. In the illumination unit 120, the light source 140 emits light of green color and the light source 141 emits light of red color and blue color. The light source 141 is formed by mounting light sources of red color and blue color in an identical package. Although the light source 141 formed by mounting light sources of two colors in an identical package is shown here, either three light sources may be mounted in independent packages respectively or two or more light sources may be mounted integrally in a single package.

Light emitted from the light sources 140 and 141 enters the condenser lenses 142 and 143. The condenser lenses 142 and 143 are arranged so that the light sources may be located at substantially composite focus positions respectively and the light fluxes emitted from the light sources 140 and 141 become substantially collimated light by the condenser lenses. The substantially collimated light from the respective light sources is emitted toward the color composition unit 144.

The projection unit 122 is a projection optical system including a plurality of lenses and projects image light from the display unit 121 while changing the angle in response to an angle of view.

The light guide unit 123 can constitute the HMD 1 having see-through nature by including a light guide plate configuration using a diffraction grating, a volume hologram, a beam splitter array (BSA), or the like. For example, the light guide unit 123 using a diffraction grating forms a structure of parallel plates and has an input diffraction grating unit for taking light into the light guide unit 123, a propagation unit to propagate the taken light in the parallel plates by total reflection, and an output diffraction grating unit for emitting the light propagated by the total reflection outside the light guide unit 123. Otherwise, the light guide unit 123 using a beam splitter array also forms a structure of parallel plates and has a plurality of reflective surfaces arranged in an array so as to receive light from an end face section of the parallel plates, propagate the light in the parallel plates by total reflection, and emit the light propagated by the total reflection outside the light guide unit. The reflective surfaces arranged in an array are configured so as to reflect a part and transmit another part of the light propagated by the total reflection.

In this way, according to the configuration of FIGS. 7A and 7B, the dimension of the A part can be reduced by arranging the bending mirror 146 between the microlens array 130 and the condensing lens 131 and bending the optical system. The size of the effective luminous flux system of the bending mirror 146 on this occasion is substantially equal to the size of the polarization splitter 132.

The ranges in the horizontal and vertical directions of the display image region 111 (shown in FIG. 3) in the HMD 1 are generally different from each other and the display range in the horizontal direction is wider. The lengths in the horizontal and vertical directions of a microdisplay effective region of the display unit 121 therefore are also different from each other, and the length in the vertical direction is shorter. The bending mirror 146 and the polarization splitter 132 therefore can be downsized by being configured so as to be bent in the vertical equivalent direction (short direction).

In a general illumination optical system of a projector having telecentricity, a distance from the microlens array 130 to the display unit 121 is tried to be reduced by using a condensing lens including a plurality of lenses. In an optical system of the virtual image generation unit 101 used in the HMD 1, however, the bending mirror 146 and the polarization splitter 132 have to be arranged in a light path by the reason stated above, and if the sizes of those units are taken into consideration, it is possible to configure an optical system without increasing the size even when a single condensing lens is used.

In the virtual image generation unit 101 shown in FIGS. 7A and 7B, by arranging the projection unit 122 above the light guide unit 123 and arranging the bent illumination unit 120 further above the projection unit 122, a lateral and lateral obliquely-downward visual field can be secured. In other words, the shape of the frame unit 10 shown in FIG. 4C can be obtained. Further, by adopting a configuration of arranging a single condensing lens 131 and the bending mirror 146, it is possible to reduce the dimension A of the HMD 1, increase the convenience, and secure a visual field. In addition, cost reduction and weight reduction can be achieved by using a single lens.

Figure 8:
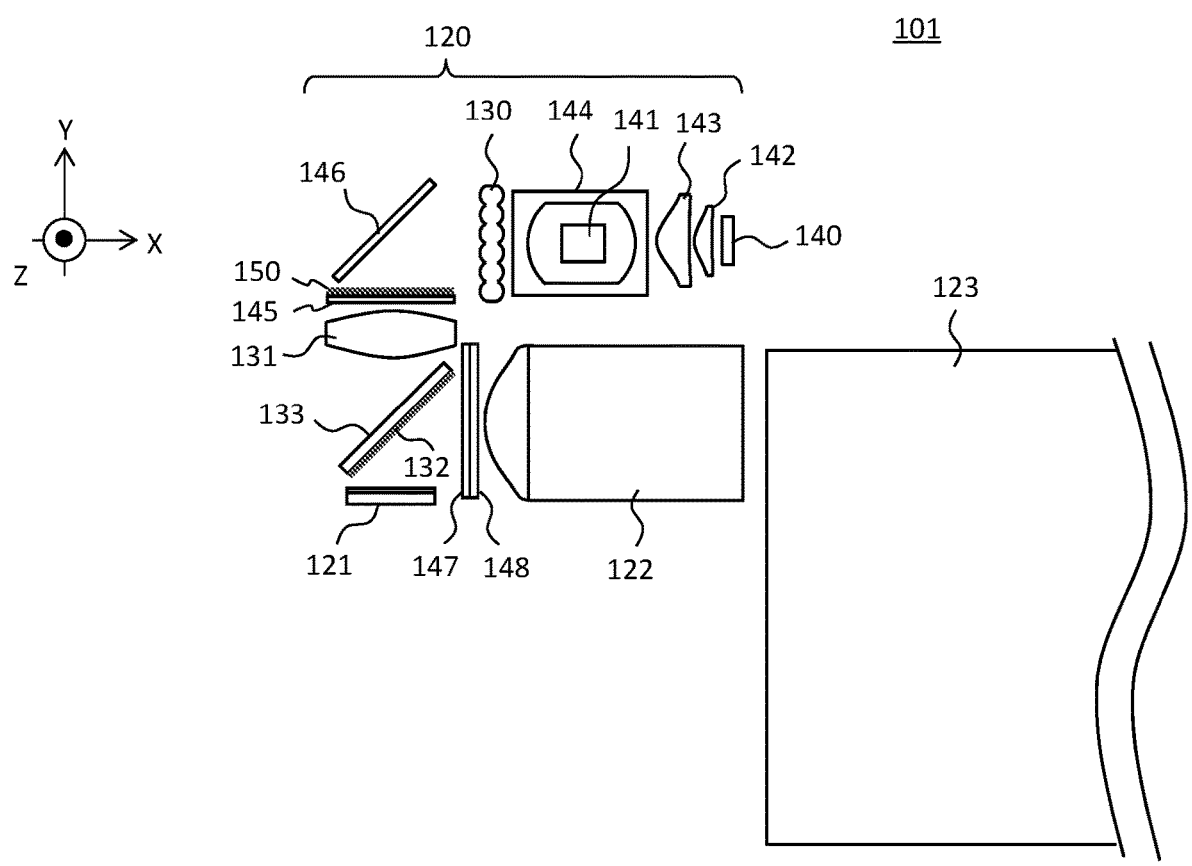
FIG. 8 is a view showing an example of a configuration of the virtual image generation unit 101.

FIG. 8 is a view showing an example of a configuration of the virtual image generation unit 101 and is a configuration of downsizing and inhibiting a conjugate image. A component identical to a component in the virtual image generation unit 101 shown in FIGS. 7A and 7B is represented by an identical reference sign and only a view viewed from a visual axis (Z axis) direction is shown. In this example, in order to inhibit cyclic conjugate images of a microlens array (lens cell) and a light source replicated at the light guide unit 123, the diffusion plate 150 is added between the microlens array 130 and the display unit 121 as explained in FIG. 6B. As a result, it is possible to blur only conjugate images of the microlens cell and the light source so as to be inconspicuous without affecting the resolution of an image (virtual image) that is an enlarged image of the display unit 121. Further, the dimension A of the HMD 1 can be reduced by adopting a configuration of arranging the bending mirror 146 similarly to FIGS. 7A and 7B.

Here, the position of the diffusion plate 150 is arranged at a position apart from the microlens array 130 and close to the condensing lens 131. Although the diffusion plate 150 is arranged on the front side (upper side in the figure) of the condensing lens 131 in this example, the diffusion plate 150 may also be arranged on the rear side (lower side in the figure) of the condensing lens 131. By arranging the diffusion plate 150 at a position close to the condensing lens 131, it is possible to reduce the diffusion angle of the diffusion plate 150 and blur only the conjugate images of the microlens cell and the light source while efficiency is inhibited from being deteriorated by the insertion of the diffusion plate 150.

The effect of inserting the diffusion plate 150 is recognized also in a configuration of simply emitting light from the color composition unit 144 to the display unit 121 without using the microlens array 130. By applying the diffusion plate 150 to a configuration of using the microlens array 130, however, an illumination system having high efficiency, high brightness uniformity, and the effect of inhibiting a conjugate image generated when an image is seen through the light guide plate 123 can be obtained.

Further, in consideration of the influence of the diffusion plate 150 on polarization, a configuration of arranging the position of the polarization filter 145 immediately after the diffusion plate 150 is adopted. On this occasion, a configuration of sticking and integrating the diffusion plate 150 and the polarization filter 145 together may also be adopted.

In the meantime, it is also possible to integrate the diffusion plate 150 and the condensing lens 131. On this occasion, a configuration of making the surface of the condensing lens 131 a sandy surface instead of the diffusion plate 150 and adding a diffusion function may also be adopted.

If a focal length f of the condensing lens 131 takes a value on the longer side in the aforementioned range of 8 to 14 mm, the size of an optical system increases but the effect of inhibiting a conjugate image increases. This is because a light source image on a microlens cell becomes large, a distance between light source images reduces, variation of light and dark in a conjugate image reduces, and hence the conjugate image becomes hardly visible. A configuration effective in the case of a long focal length is explained hereunder.

Figure 9:
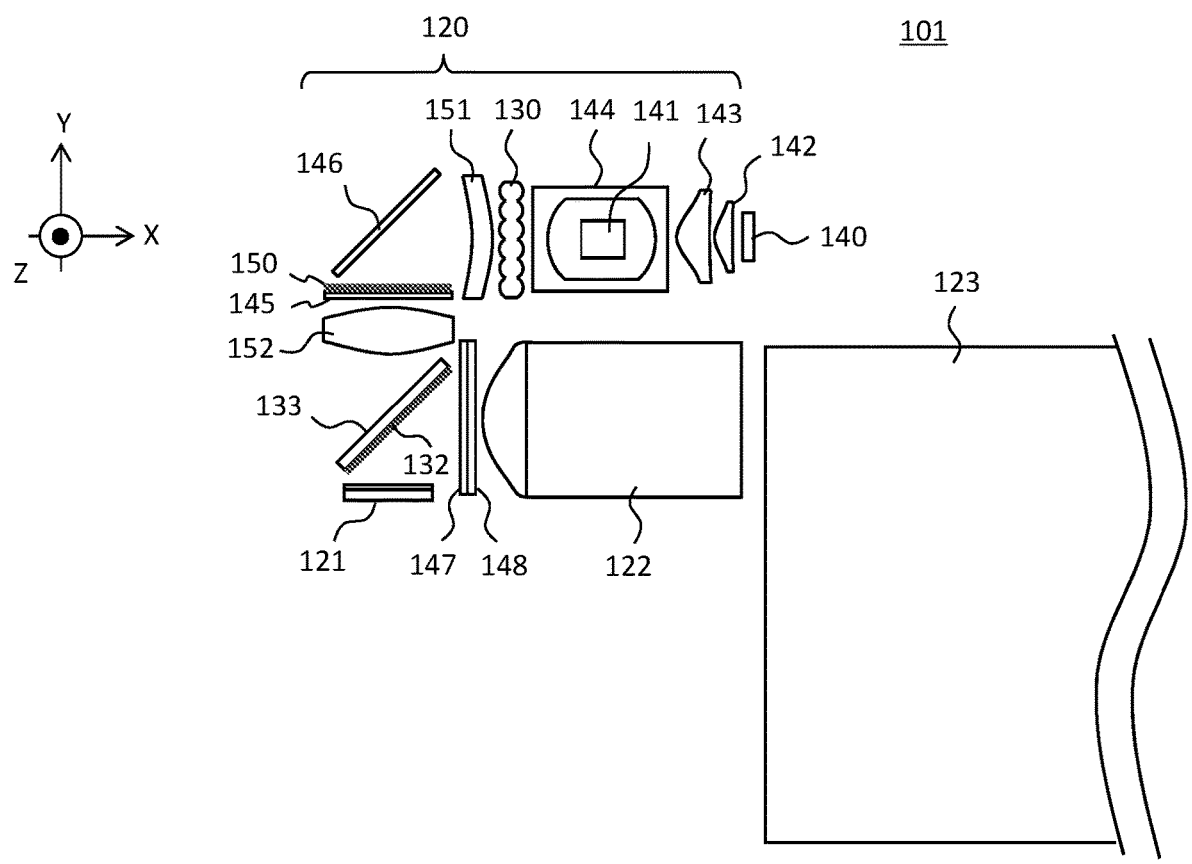
FIG. 9 is a view showing a modified example of FIG. 8.

FIG. 9 is a view showing a modified example of FIG. 8 and is a configuration of using two condensing lenses in a condensing optical member. By using about two lenses when a focal length is long and arranging a front side principal plane and a rear side principal plane as close as possible, an optical system can be downsized.

A first condensing lens 151 is arranged behind the microlens array 130, a second condensing lens 152 is arranged behind the bending mirror 146, and then the polarization splitter 132 and the display unit 121 follow. The diffusion plate 150 and the polarization filter 145 are arranged in the vicinities (here, front side) of the second condensing lens 152.

When the two condensing lenses 151 and 152 are arranged, a distance from the microlens array 130 to the first condensing lens 151 and a light path length from the second condensing lens 152 to the display unit 121 become unbalanced. The optical system therefore can be downsized by adopting a meniscus lens as the first condensing lens 151 and a biconvex lens as the second condensing lens 152 in order to move a composite principal plane of the two condensing lenses 151 and 152 as close to the second condensing lens 152 as possible.

Second Embodiment

In a second embodiment, reduction of a dimension B (vertical direction) of the frame unit 10 shown in FIGS. 4A to 4C and inhibition of a conjugate image are explained.

Figure 10:
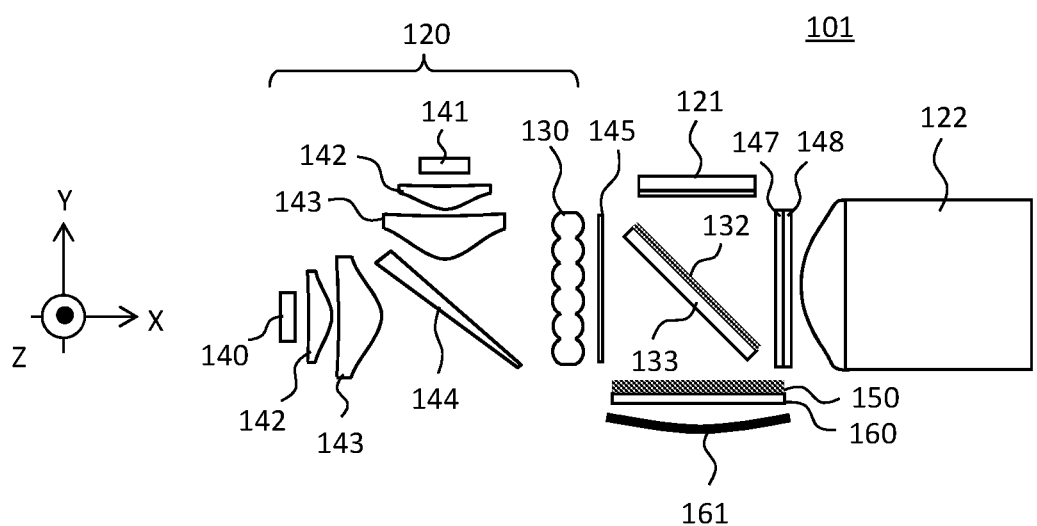
FIG. 10 is a view showing an example of a configuration of the virtual image generation unit 101 (a second embodiment)

FIG. 10 is a view showing an example of a configuration of the virtual image generation unit 101 and is a configuration of inhibiting a conjugate image while a dimension B is reduced. A component having a function similar to the one of the first embodiment is represented by an identical reference sign. Parts different from those of the first embodiment are explained hereunder.

In the present embodiment, a width (dimension B) of an optical system in a vertical direction is reduced by arranging the illumination unit 120 to the projection unit 122 in line in a horizontal direction (X direction). Light emitted from the light sources 140 and 141 and having passed through the microlens array 130 enters the polarization filter 145 and only linearly polarized light of a predetermined direction is transmitted. Successively, the linearly polarized light is reflected by the polarization splitter 132 downward in the figure and passes through the diffusion plate 150 and a quarter wave plate 160. Conjugate images of the microlens array 130 and the light sources 140 and 141 are inhibited at the diffusion plate 150 and the light is converted to circularly polarized light at the quarter wave plate 160 and enters a concave mirror 161.

The light reflected by the concave mirror 161 passes through the quarter wave plate 160 again, thus becomes linearly polarized light in a direction perpendicular to the aforementioned direction, permeates the diffusion plate 150 and the polarization splitter 132, and illuminates the display unit 121. Image light generated at the display unit 121 is reflected by the polarization splitter 132, advances in the right direction in the figure, and enters the projection unit 122 through the polarization filter 147 and the quarter wave plate 148.

In this configuration, the concave mirror 161 corresponds to the condensing optical member 131 described in the first embodiment and reflected light focused by the concave mirror 161 enters the display unit 121. The concave mirror 161 is desirably an aspheric concave mirror. Further, the diffusion plate 150 for blurring conjugate images is arranged in the vicinity of the concave mirror 161 that is a condensing optical member.

That is, the concave mirror 161 and the display unit 121 face each other with the polarization splitter 132 interposed, the microlens array 130 and the display unit 121 are arranged in a substantially orthogonal geometric relationship, and the diffusion plate 150 and the quarter wave plate 160 are arranged between the polarization splitter 132 and the concave mirror 161.

According to this configuration, the width of the optical system in the vertical direction (Y direction) is reduced and a shape of the frame unit 10 like in FIG. 4B can be obtained. It goes without saying that the effect of inhibiting conjugate images is also obtained since the diffusion plate 150 is incorporated.

Figure 11:
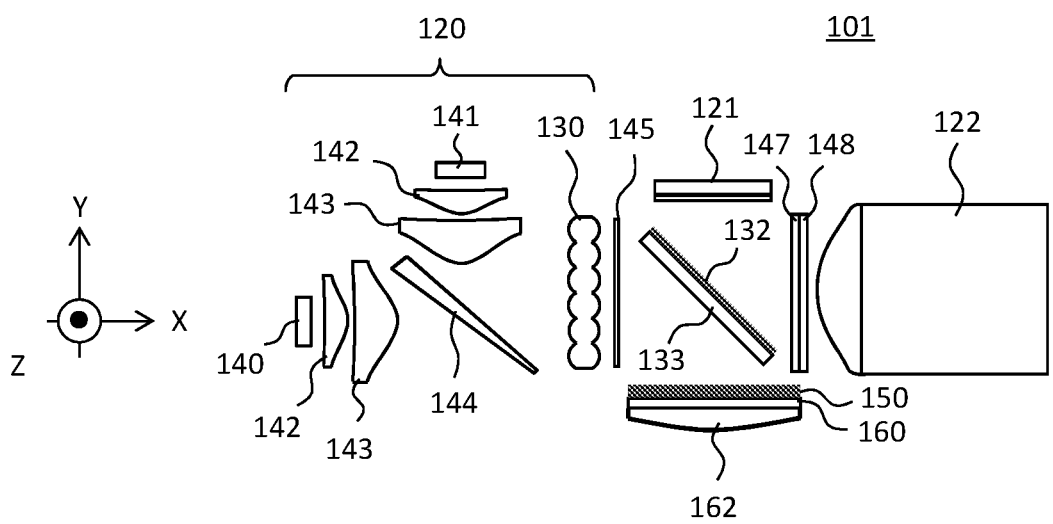
FIG. 11 is a view showing a modified example of FIG. 10.

FIG. 11 is a view showing a modified example of FIG. 10 and is a configuration of arranging an internal reflection type lens 162 in place of the concave mirror 161. The internal reflection type lens 162 is a lens that makes use of internal reflection by applying mirror coating to a convex lens surface and has the same effects as the concave mirror 161. The internal reflection type lens 162 is desirably a plano-convex aspheric lens to the convex aspheric surface of which reflective coating is applied. That is, a plano-convex lens is used as a base, the quarter wave plate 160 and the diffusion plate 150 are stuck to the incident surface of the plano-convex lens and can be integrated, and that contributes to downsizing too.

The focal lengths of the concave mirror 161 in FIG. 10 and the internal reflection type lens 162 in FIG. 11 may be equivalent to the focal length of the condensing optical member 131 described in the first embodiment.

Meanwhile, it is also possible to integrate the diffusion plate 150 and the concave mirror 161 or the internal reflection type lens 162. On this occasion, a configuration of making the curved surface of the concave mirror 161 or the internal reflection type lens 162 a sandy surface instead of the diffusion plate 150 and adding a diffusion function may also be adopted.

According to the configuration of the second embodiment, because a light path length of an illumination optical system is secured in a small space and the bending mirror 146 used in the first embodiment is not required, the illumination unit 120 becomes an optical system of a straight shape. The dimension B of the frame unit 10 therefore can be reduced and downsizing and a good visual field can be secured.

Finally, application examples of HMDs stated in the above embodiments are described.

Figure 12:
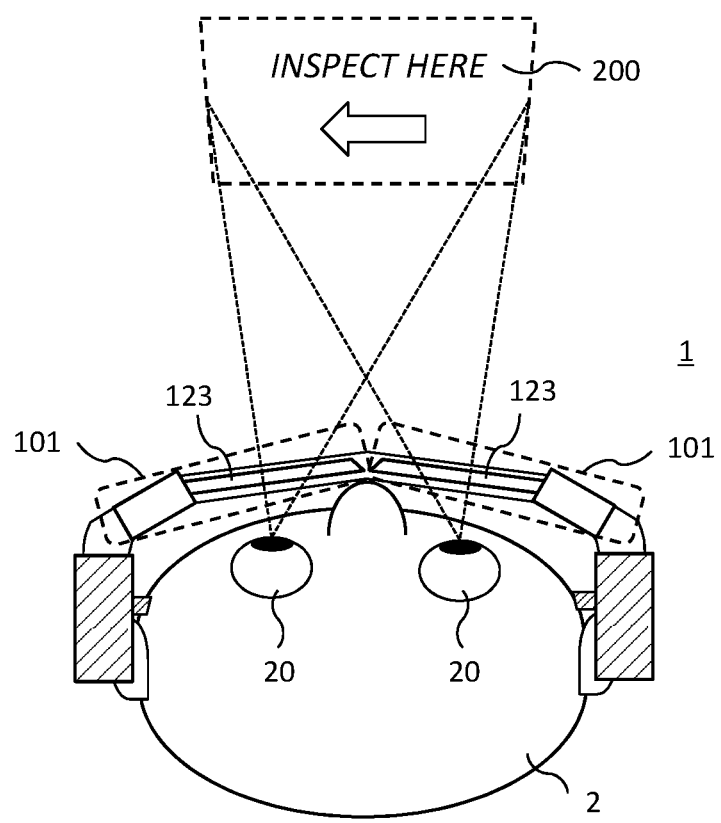
FIG. 12 is a view showing an application example of the HMD 1.

FIG. 12 is a view showing an application example of the HMD 1. In a visual field of the user (operator) 2, an image (virtual image) 200 from the HMD 1 is displayed and work procedures in inspection and assembly of industrial equipment or the like are displayed for example. The user 2 can work while visualizing a work object (equipment, a tool, or the like) and a work instruction simultaneously and hence can perform more secure work and reduce work errors.

Figure 13:
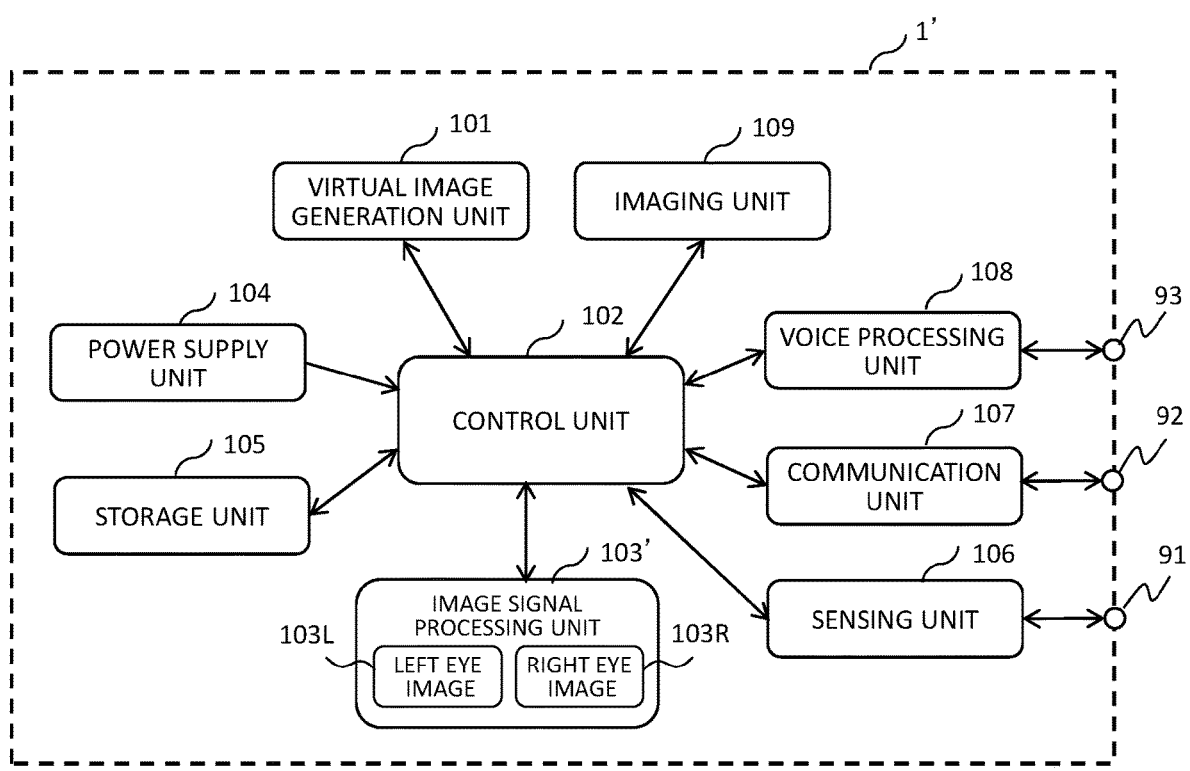
FIG. 13 is a view showing a modified example of FIG. 1.

FIG. 13 is a modified example of FIG. 1 and particularly shows a configuration for displaying images in both eyes with a high degree of accuracy. In an image signal processing unit 103' of an HMD 1', a left eye image generation unit 103L and a right eye image generation unit 103R are installed respectively. In the case of binocular display, images have to be displayed on both the left and right sides respectively but the relative positions of the images may deviate sometimes due to assembly errors of the virtual image generation unit 101, changes of an ambient temperature, and the like. To cope with this, independent image displays on the left and right respectively are enabled by installing the left eye image generation unit 103L and the right eye image generation unit 103R respectively in the image signal processing unit 103'. As a result, when the display positions of left and right images deviate from each other for example, the display positions of the left and right images are corrected through signal processing at the left eye image generation unit 103L and the right eye image generation unit 103R, and resultantly the positional deviation can be eliminated.

Further, in the case of the HMD 1' for both eyes, the incident directions of left image light and right image light to the light guide unit 123 are different from each other. When a brightness distribution and a color distribution change by the incident angle characteristics of a reflective film, a diffraction grating, a volume hologram, and the like constituting the light guide unit 123, changes in brightness and color of left and right images are also symmetrical. By using the left eye image generation unit 103L and the right eye image generation unit 103R therefore, deviations in brightness and color distribution caused by geometric symmetry of left and right can be corrected by signal processing.

Further, the HMD 1' is used indoors and outdoors. The brightness of a displayed image therefore has to be adjusted in response to the brightness of an ambient environment. As an example, an illuminance sensor is connected to the sensing unit 106 through the input/output unit 91, and the brightness of an image displayed by the image signal processing unit 103' may be adjusted in response to an output of the illuminance sensor.

Although the embodiments according to the present invention have heretofore been explained, the present invention is not limited to the embodiments stated above and includes various modified examples. For example, the above embodiments are explained in detail for the present invention to be comprehensible, and the present invention is not limited to the case having all the configurations explained here. Further, a part of a configuration in an embodiment can be replaced with a configuration of another embodiment. Furthermore, a configuration of an embodiment can also be added to a configuration of another embodiment. Moreover, a part of a configuration in an embodiment can also be added to, deleted from, or replaced with another configuration.

Further, the functional configurations of the HMD and virtual image generation unit are classified in accordance with major processing contents in order to facilitate comprehension. The present invention is not limited by manners and names for classifying constituent components. The configurations of the HMD and virtual image generation unit can also be classified into more constituent components in accordance with processing contents. Furthermore, one constituent component can be classified so as to carry out further processing.

Moreover, it goes without saying that the present invention can be applied as well to not only a head mounted display (HMD) but also another image (virtual image) display device having a configuration of a virtual image generation unit explained in the embodiments.

What is claimed is:

1. A head mounted display that is mounted on the head of a user and displays an image in a visual field, comprising:
    a display unit to generate a displayed image;
    an illumination unit to emit illumination light to the display unit;
    a projection unit to project image light from the display unit; and
    a light guide unit to transmit image light from the projection unit to pupils of the user,
    wherein the illumination unit has:
    a light source unit to emit light;
    a microlens array that is illuminated by light emitted from the light source unit and becomes a virtual secondary light source;
    a condensing optical member to focus light from the microlens array on the display unit; and
    a diffusion plate to diffuse light from the microlens array, and
    the diffusion plate is arranged closer to the condensing optical member than to the microlens array.

2. The head mounted display according to claim 1,
    wherein the condensing optical member is a single condensing lens, and
    a first distance from the microlens array to the condensing lens and a second distance from the condensing lens to the display unit are substantially equal.

3. The head mounted display according to claim 1,
wherein the condensing optical member includes two condensing lenses,
a first condensing lens arranged on the side close to the microlens array is a meniscus lens,
a second condensing lens arranged on the side close to the display unit is a biconvex lens, and
the diffusion plate is arranged closer to the second condensing lens than to the first condensing lens.

4. The head mounted display according to claim 1, wherein the condensing optical member is a concave mirror.

5. The head mounted display according to claim 4,
wherein the concave mirror and the display unit are arranged so as to face each other with a polarization splitter interposed,
the microlens array and the display unit are arranged in a substantially orthogonal geometric relationship, and
the diffusion plate and a quarter wave plate are arranged between the polarization splitter and the concave mirror.

6. The head mounted display according to claim 4, wherein the concave mirror is an aspheric concave mirror or a plano-convex aspheric lens to the convex aspheric surface of which reflective coating is applied.

7. The head mounted display according to claim 1, wherein a focal length of the condensing optical member is in the range of 8 to 14 mm.

8. The head mounted display according to claim 1,
wherein a polarization filter to be permeated only by linearly polarized light in a predetermined direction is stuck and integrated to the diffusion plate, and
the diffusion plate and the polarization filter that are integrated are arranged so that the diffusion plate may be located on the side of the microlens array and the polarization filter may be located on the side of the display unit.

9. The head mounted display according to claim 1, wherein the diffusion plate is integrated into the condensing optical member by making the surface of the condensing optical member a sandy surface.

10. The head mounted display according to claim 1,
wherein the illumination unit has:
a bending mirror for bending a light path; and
a polarization splitter for guiding image light after the image light is reflected at the display unit to the projection unit,
the bending mirror and the polarization splitter are arranged so as to bend light in a short direction of a display region of the display unit, and
the bending mirror and the polarization splitter are substantially parallel.

11. The head mounted display according to claim 1,
wherein the light guide unit has an incident surface which receives image light and substantially parallel first and second internal reflective surfaces which propagate incident image light through total reflection, and
a plurality of substantially parallel partially reflective surface arrays for projecting image light are installed in the interior of the light guide unit.

12. The head mounted display according to claim 1, wherein the illumination unit is arranged above the projection unit from the perspective of the user.

13. The head mounted display according to claim 1, comprising a polarization splitter to form a light path to guide illumination light to the display unit and a light path to guide reflected light from the display unit to the projection unit,
wherein the polarization splitter is formed by sticking a wire grid film to a transparent substrate.

14. The head mounted display according to claim 1 further comprising:
an imaging unit to shoot an image in a direction of a visual field of the user;
a power supply unit to supply electric power;
a storage unit to store information;
a sensing unit to detect a position and a posture of the user;
a communication unit to communicate with an external device;
a voice processing unit to input or output a voice signal; and
a control unit to control an entire device.

* * * * *